United States Patent
Wang et al.

(10) Patent No.: US 12,375,195 B2
(45) Date of Patent: Jul. 29, 2025

(54) SPECTRUM EMISSION MASK VERIFICATION BASED ON EIRP MEASUREMENT

(71) Applicant: Apple Inc., Cupertino, CA (US)

(72) Inventors: Fucheng Wang, Cupertino, CA (US); Fahmi L Al Sabie, El Cajon, CA (US); Vikas O Jain, Newark, CA (US); In Kwang Kim, San Diego, CA (US); Abhiram Rudrapatna Sridhar, San Jose, CA (US); Krishna Kalyanaraman, San Jose, CA (US); Ashwin Mohan, San Diego, CA (US); Anatoliy S Ioffe, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 379 days.

(21) Appl. No.: 18/101,020

(22) Filed: Jan. 24, 2023

(65) Prior Publication Data
US 2023/0344533 A1 Oct. 26, 2023

Related U.S. Application Data

(60) Provisional application No. 63/333,778, filed on Apr. 22, 2022.

(51) Int. Cl.
*H04B 17/318* (2015.01)
*H04B 10/00* (2013.01)
(Continued)

(52) U.S. Cl.
CPC .......... *H04B 17/318* (2015.01); *H04B 17/23* (2015.01)

(58) Field of Classification Search
None
See application file for complete search history.

(56) References Cited

U.S. PATENT DOCUMENTS 7,634,233 B2 * 12/2009 Deng ................ H04L 27/26265
370/335
7,706,764 B2 * 4/2010 Reynolds ............ H04B 17/336
455/226.1
(Continued)

OTHER PUBLICATIONS

R5-202900 "Updates of FR2 MU and TT in TS 38.521-2", Anritsu, NTT Docomo Inc., 3GPP TSG-RAN5 Meeting #87-e, May 18-29, 2020.
(Continued)

Primary Examiner — Tuan A Tran
(74) Attorney, Agent, or Firm — FLETCHER YODER PC

(57) ABSTRACT

A testing device determines an Effective Isotropic Radiated Power (EIRP) of a wanted signal at a beam-peak direction and a maximum Total Radiated Power (TRP) of the wanted signal. The testing device then determines a power difference ($\Delta P$) between the EIRP of the wanted signal at the beam-peak direction and the maximum TRP of the wanted signal. The testing device determines EIRP of a spectral emission mask (SEM) at each measurement bandwidth step at the beam-peak direction. The testing device then determines TRP at each measurement bandwidth step by determining a difference between the EIRP of the SEM at that measurement bandwidth step and the power difference ($\Delta P$). The testing device compares the TRP at each measurement bandwidth step to a SEM specification, and reports whether the SEM specification has been met.

20 Claims, 5 Drawing Sheets

(51) Int. Cl.
*H04B 10/071* (2013.01)
*H04B 17/23* (2015.01)

(56) References Cited

U.S. PATENT DOCUMENTS

| | | | | |
|---|---|---|---|---|
| 7,733,229 | B2* | 6/2010 | Reunamaki | G06K 7/10306 |
| | | | | 340/572.1 |
| 7,738,545 | B2* | 6/2010 | Giannakis | H04B 1/7174 |
| | | | | 375/232 |
| 7,958,041 | B2* | 6/2011 | Stanforth | G06Q 10/06395 |
| | | | | 705/37 |
| 8,234,208 | B2* | 7/2012 | Stanforth | H04W 72/23 |
| | | | | 705/37 |
| 8,249,966 | B2* | 8/2012 | Stanforth | G06Q 40/00 |
| | | | | 705/37 |
| 8,885,527 | B2* | 11/2014 | Stanforth | G06Q 99/00 |
| | | | | 370/310 |
| 9,129,343 | B2* | 9/2015 | Stanforth | G06Q 50/60 |
| 9,585,026 | B2* | 2/2017 | Liu | H04W 12/06 |
| 10,111,243 | B2* | 10/2018 | Mitola, III | H04W 16/14 |
| 10,135,520 | B2* | 11/2018 | Lemme | H04B 7/19 |
| 10,361,808 | B2* | 7/2019 | Eliaz | H04W 8/22 |
| 10,462,674 | B2* | 10/2019 | Freda | H04W 16/14 |
| 10,517,050 | B2* | 12/2019 | Nguyen | H04W 52/36 |
| 10,587,332 | B2* | 3/2020 | Lemme | H01Q 21/00 |
| 11,082,980 | B2* | 8/2021 | Furuichi | H04W 72/53 |
| 11,228,982 | B2* | 1/2022 | Gubeskys | H04B 1/3838 |
| 11,291,013 | B2* | 3/2022 | Weissman | H04L 5/0076 |
| 11,323,176 | B2* | 5/2022 | Vaez-Ghaemi | G01M 11/3109 |
| 11,546,776 | B2* | 1/2023 | Furuichi | H04W 16/14 |
| 11,778,651 | B2* | 10/2023 | Weissman | H04L 5/003 |
| | | | | 370/329 |
| 2015/0373554 | A1* | 12/2015 | Freda | H04W 16/14 |
| | | | | 455/450 |
| 2019/0036597 | A1* | 1/2019 | Lemme | H04B 7/18513 |
| 2020/0229102 | A1* | 7/2020 | Gubeskys | H04W 52/146 |

OTHER PUBLICATIONS

R4-1700227 "More on ACLR with beamforming", MediaTek Inc., 3GPP TSG-RAN WG4 NR AH Meeting, Spokane, Washington, USA, Jan. 17-19, 2017.

R5-202842 "Discussion on AP 85.25 ACLR metric change", Qualcomm Inc., 3GPP TSG-RAN5 Meeting #87-e, May 18-29, 2020.

842590 D01 Upper Microwave Flexible Use Service (UMFUS) Devices, Federal Communications Commission Office of Engineering and Technology Laboratory Division, Apr. 20, 2021.

ETSI TS 138 101-2 V17.5.0, User Equipment (UE) radio transmission and reception; Part 2: Range 2 Standalone (3GPP TS 38.101-2 version 17.5.0 Release 17) Apr. 2022.

ETSI TS 138 521-2 v16.6.0, User Equipment (UE) conformance specification; radio transmission and reception; Part 2: Range 2 Standalone, (3GPP TS 38.521-2 version 16.6.0 Release 16) Feb. 2021.

3GPP TS 38.521-2 V16.11.0 Release 16; Annex A (normative): Measurement channels, Mar. 2022.

* cited by examiner

| TEST METRIC | REQUIREMENTS |
|---|---|
| EIRP-BASED | MINIMUM PEAK EIRP |
| | SPHERICAL COVERAGE EIRP |
| | MAXIMUM EIRP |
| | MINIMUM OUTPUT POWER |
| | TRANSMIT OFF POWER |
| | TRANSMIT ON/OFF TIME MASK |
| | POWER CONTROL |
| | TRANSMIT SIGNAL QUALITY |
| | ADJACENT CHANNEL LEAKAGE RATIO (ACLR) |
| | OCCUPIED BANDWIDTH |
| TRP-BASED | MAXIMUM TRP |
| | SPECTRUM EMISSION MASK (SEM) |
| | SPURIOUS EMISSION |

| SPECTRUM EMISSION LIMIT (dBm) / CHANNEL BANDWIDTH | | | | | |
|---|---|---|---|---|---|
| $\Delta f_{OOB}$ MHz) | 50 (MHz) | 100 (MHz) | 200 (MHz) | 400 (MHz) | MEASUREMENT BANDWIDTH |
| ± 0-5 | -5 | -5 | -5 | -5 | 1 MHz |
| ± 5-10 | -13 | -5 | -5 | -5 | 1 MHz |
| ± 10-20 | -13 | -13 | -5 | -5 | 1 MHz |
| ± 20-40 | -13 | -13 | -13 | -5 | 1 MHz |
| ± 40-100 | -13 | -13 | -13 | -13 | 1 MHz |
| ± 100-200 |  | -13 | -13 | -13 | 1 MHz |
| ± 200-400 |  |  | -13 | -13 | 1 MHz |
| ± 400-800 |  |  |  | -13 | 1 MHz |

SPECTRUM EMISSION MASK VERIFICATION BASED ON EIRP MEASUREMENT

CROSS-REFERENCE TO RELATED APPLICATIONS

This application claims priority to U.S. Provisional Application No. 63/333,778, filed Apr. 22, 2022, entitled "SPECTRUM EMISSION MASK VERIFICATION BASED ON EIRP MEASUREMENT," the disclosure of which is incorporated by reference herein in its entirety for all purposes.

BACKGROUND

The present disclosure relates generally to wireless communication, and more specifically to meeting specification requirements for user equipment.

User equipment (e.g., a mobile communication device) may include a transmitter coupled to one or more antennas to enable the user equipment to transmit wireless signals. A standards body, such as the Third Generation Partnership Project (3GPP), may specify certain requirements for which the user equipment may follow. For example, the 3GPP may specify a spectral emission mask to which the user equipment may conform. In particular, the spectral emission mask may include transmission power limits for out-of-channel emissions for which the user equipment may comply when transmitting a signal in a frequency channel However, verifying that the user equipment does not exceed the spectral emission mask may time-consuming and resource-intensive.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method includes receiving, at processing circuitry, Effective Isotropic Radiated Power (EIRP) of a signal, receiving, at the processing circuitry, a Total Radiated Power (TRP) of the signal, and receiving, at the processing circuitry, EIRP associated with a spectral emission mask (SEM). The method also includes determining, using the processing circuitry, TRP associated with the SEM based on the EIRP associated with the SEM, the EIRP of the signal, and the TRP of the signal. The method further includes indicating, using the processing circuitry, whether the TRP associated with the SEM exceeds a threshold.

In another embodiment, one or more tangible, non-transitory, computer-readable media, stores instructions that cause processing circuitry to receive Effective Isotropic Radiated Power (EIRP) of a signal, receive a Total Radiated Power (TRP) of the signal, and receive EIRP associated with a spectral emission mask (SEM). The instructions also cause the processing circuitry to determine TRP associated with the SEM based on the EIRP associated with the SEM, the EIRP of the signal, and the TRP of the signal. The instructions further cause the processing circuitry to indicate whether the TRP associated with the SEM exceeds a threshold.

In yet another embodiment, a receiving device includes one or more antennas, a receiver that receives a signal via the one or more antennas, and processing circuitry. The processing circuitry receives Effective Isotropic Radiated Power (EIRP) of a signal, receives a Total Radiated Power (TRP) of the signal, and receives EIRP associated with a spectral emission mask (SEM). The processing circuitry also determines TRP associated with the SEM based on the EIRP associated with the SEM, the EIRP of the signal, and the TRP of the signal. The processing circuitry further indicates whether the TRP associated with the SEM exceeds a threshold.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
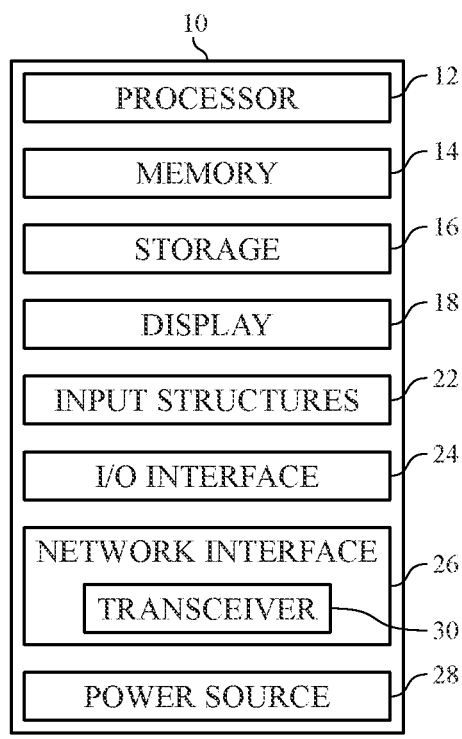
FIG. 1 is a block diagram of user equipment, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

This disclosure is directed to meeting specification requirements for user equipment. User equipment (e.g., a mobile communication device) may include a transmitter coupled to an antenna to enable the user equipment to transmit wireless signals. A standards body, such as the Third Generation Partnership Project (3GPP), may specify certain requirements for which the user equipment may follow. For example, the 3GPP may specify a spectral emission mask (SEM) to which the user equipment may conform. In particular, the SEM may include transmission power limits for out-of-channel emissions for which the user equipment may comply when transmitting a signal in a frequency channel However, the 3GPP specifies that testing the SEM-related measurements (e.g., out-of-channel emissions when transmitting a signal in a frequency channel) be performed using Total Radiated Power (TRP). Such measurements may include causing the user equipment to beam-lock at a particular spatial direction and measuring Effective Isotropic Radiated Power (EIRP) at every spatial angle, and then averaging over a sphere surrounding the user equipment. As each spatial angle may corresponding to each TRP "grid point" of the sphere, where there may over a thousand grid points in the sphere, this process may be time-consuming and resource-intensive.

Embodiments herein provide various apparatuses and techniques to reduce the time and resources used to verify that user equipment meets SEM specifications (e.g., as set forth by the 3GPP). Rather than measuring TRP, a testing device (which, in some embodiments, may include the user equipment) may derive the TRP using EIRP a relationship between a power difference between the SEM using TRP and the SEM using EIRP and a power difference between maximum TRP and maximum EIRP (e.g., at a beam-peak direction) to verify that the user equipment meets a SEM specification. In particular, these power differences may be equal or approximately the same. As such, the testing device may determine an EIRP of a wanted signal (e.g., a signal being sent by the user equipment for testing purposes by the testing device) at a beam-peak direction (e.g., the maximum EIRP), and the maximum TRP of the wanted signal. Advantageously, the testing device may already perform these measurements to conform to the 3GPP specification, so there may be no extra time or resources used by the testing device to obtain these values. The testing device may then determine a power difference ($\Delta P$) between the EIRP of the wanted signal at the beam-peak direction and the maximum TRP of the wanted signal. In some embodiments, the testing device may determine EIRP of an SEM at each measurement bandwidth step at the beam-peak direction, which may be specified by, for example, the 3GPP. The testing device may then determine TRP at each measurement bandwidth step by determining a difference between the EIRP of the SEM at that measurement bandwidth step and the power difference ($\Delta P$) between the EIRP of the wanted signal at the beam-peak direction and the maximum TRP of the wanted signal. If the TRP at each measurement bandwidth step meets the SEM specification, then the testing device may report that the specification is met. If the TRP at any measurement bandwidth step does not meet the SEM specification, then the testing device may report that the specification has not been met.

FIG. 1 is a block diagram of user equipment 10 (e.g., an electronic device, a wireless communication device, a mobile communication device, and so on), according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 28. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 28 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the user equipment 10.

By way of example, the user equipment 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the user equipment 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 10 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with the user equipment 10 (e.g., pressing a button to increase or decrease a volume level). The I/O interface 24 may enable user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FTC)), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the network interface 26 may include, for example, one or more interfaces for using a cellular communication standard of the 5G specifications that include the millimeter wave (mmWave) frequency range (e.g., 24.25-300 gigahertz (GHz)) that defines and/or enables frequency ranges used for wireless communication. The network interface 26 of the user equipment 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth. As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 28 of the user equipment 10 may include any suitable source of power, such as a rechargeable lithium polymer (Li-poly) battery and/or an alternating current (AC) power converter.

Figure 2:
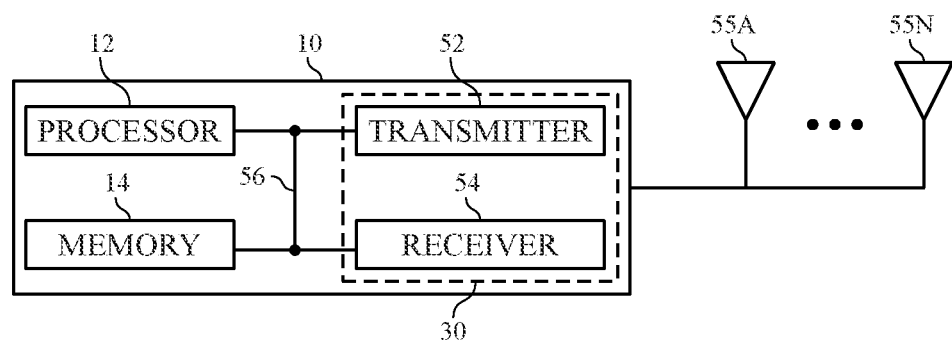
FIG. 2 is a functional diagram of the user equipment of FIG. 1, according to embodiments of the present disclosure.

FIG. 2 is a functional diagram of the user equipment 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The user equipment 10 may include the transmitter 52 and/or the receiver 54 that respectively enable transmission and reception of data between the user equipment 10 and an external device via, for example, a network (e.g., including base stations or access points) or a direct connection. As illustrated, the transmitter 52 and the receiver 54 may be combined into the transceiver 30. The user equipment 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The user equipment 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the user equipment 10 may be coupled together by a bus system 56. The bus system 56 may include a data bus, for example, as well as a power bus, a control signal bus, and a status signal bus, in addition to the data bus. The components of the user equipment 10 may be coupled together or accept or provide inputs to each other using some other mechanism.

Figure 3:
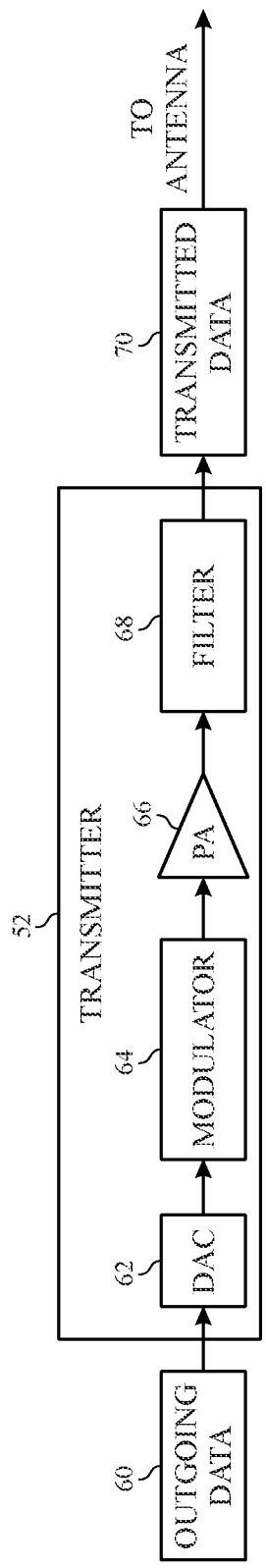
FIG. 3 is a schematic diagram of a transmitter of the user equipment of FIG. 1, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted data 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

Figure 4:
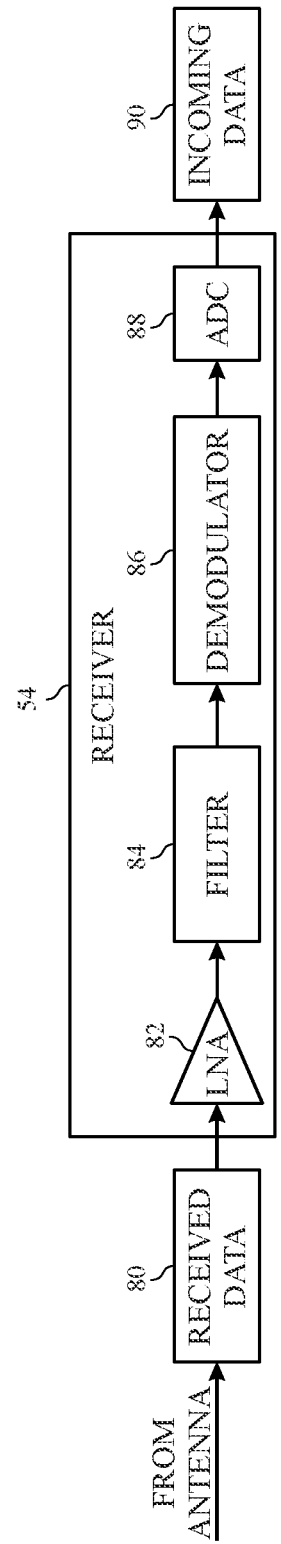
FIG. 4 is a schematic diagram of a receiver of the user equipment of FIG. 1, according to embodiments of the present disclosure.

FIG. 4 is a schematic diagram of the receiver 54 (e.g., receive circuitry), according to embodiments of the present disclosure. As illustrated, the receiver 54 may receive received data 80 from the one or more antennas 55 in the form of an analog signal. A low noise amplifier (LNA) 82 may amplify the received analog signal to a suitable level for the receiver 54 to process. A filter 84 (e.g., filter circuitry and/or software) may remove undesired noise from the received signal, such as cross-channel interference. The filter 84 may also remove additional signals received by the one or more antennas 55 that are at frequencies other than the desired signal. The filter 84 may include any suitable filter or filters to remove the undesired noise or signals from the received signal, such as a bandpass filter, a bandstop filter, a low pass filter, a high pass filter, and/or a decimation filter. A demodulator 86 may remove a radio frequency envelope and/or extract a demodulated signal from the filtered signal for processing. An analog-to-digital converter (ADC) 88 may receive the demodulated analog signal and convert the signal to a digital signal of incoming data 90 to be further processed by the user equipment 10. Additionally, the receiver 54 may include any suitable additional components not shown, or may not include certain of the illustrated components, such that the receiver 54 may receive the received data 80 via the one or more antennas 55. For example, the receiver 54 may include a mixer and/or a digital down converter.

Figures 5, 6:
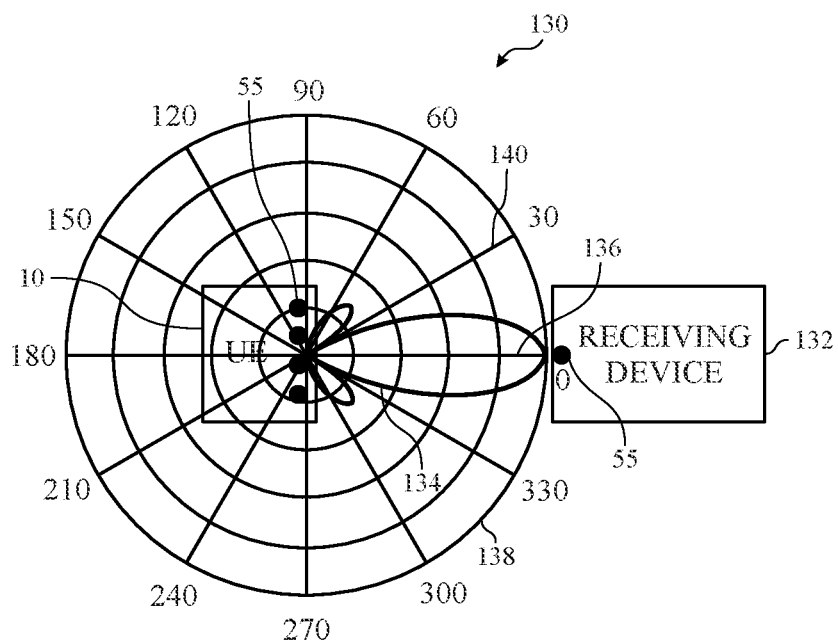
FIG. 5 is a table illustrating test metrics for Third Generation Partnership Project (3GPP) requirements for the New Radio (NR) Frequency Range 2 (FR2)
FIG. 6 is a system including the user equipment of FIG. 1 and a receiving device, according to embodiments of the present disclosure.

A standards body, such as the Third Generation Partnership Project (3GPP), may specify certain requirements for which the user equipment 10 may follow on a certain frequency range. FIG. 5 is a table illustrating test metrics 100 for 3GPP requirements 102 for the NR Frequency Range 2 (FR2). FR2 may include frequency bands between 24.25 gigahertz (GHz) to 52.6 GHz. As illustrated, transmitter 52 characteristics of the user equipment 10 are verified either by an Effective Isotropic Radiated Power (EIRP)-based test metric 104 or a Total Radiated Power (TRP)-based test metric 106.

For the EIRP-based test metric 104, a measurement is performed by beam-forming a signal via the antennas 55 and locking or fixing the signal at a target spatial angle. The target spatial angle may be at a beam-peak direction, where the EIRP is at its maximum among all spatial angles. FIG. 6 is a system 130 including the user equipment 10 and a receiving device 132, according to embodiments of the present disclosure. The receiving device 132 may include at least one antenna 55 coupled to a receiver, which may be the same or similar as that described in reference to the receiver 54 of the user equipment 10. Indeed, the receiving device 132 may include the same or similar components as those described with respect to the user equipment 10, including the processor 12, the memory 14, the storage 16, the receiver 54, and the one or more antennas 55. The receiving device 132 may act as test equipment, receive signals (e.g., including a wanted or test signal 134) transmitted by the user equipment 10, and measure characteristics (e.g., the EIRP) of the signals. As illustrated, the user equipment 10 is illustrated as sending the wireless signal 134 in a beam-peak direction 136 of 0°, where the receiving device 132 is disposed. As such, the receiving device 132 may receive the signal 134 at a maximum EIRP, and measure the EIRP.

While the beam-peak direction 136 is used here to describe obtaining a maximum EIRP, it should be understood that the disclosure also contemplates using a beam direction (e.g., a beam-increased direction), where the EIRP is increased (which may or may not include its maximum) in relation to other spatial angles. The beam-peak direction 136 may be preferred for EIRP-based tests as it may be least affected by the receiving device's 132 noise floor when performing over the air (OTA) tests, which may be particularly significant since FR2 signals may experience relatively high path loss (compared to lower frequency signals). Accordingly, the user equipment 10 and/or the receiving device 132 may perform a beam-peak search for the user equipment 10 prior to EIRP-based tests.

For the TRP-based test metric 106, measurements are performed by beam-forming signals via the antennas 55, locking or fixing the signals at every spatial angle (e.g., of a sphere 138 around the user equipment 10), and averaging the measurements over the sphere 138, which may be represented by Equation 1 below:

$$TRP = \frac{1}{4\pi} \int_0^{2\pi} \int_0^{\pi} EIRP(\theta, \varphi) \sin\theta d\theta d\varphi \qquad \text{(Equation 1)}$$

It should be noted that a surface area of a sphere is $4\pi r^2$, where radius r is normalized in Equation 1. Additionally, θ and φ may represent a polar angle and an azimuthal angle, or vice versa, as they pertain to spherical coordinates.

However, the TRP-based test metric 106 may be a tedious, time-consuming, and resource intensive measurement due to its lengthy test time, as the EIRP may be measured at each TRP "grid point" of the sphere 138, and the number of grid points may range from above a hundred to more than a thousand for the sphere 138. Moreover, at certain spatial angles for the TRP-based test metric 106, the EIRP may be much lower than at the beam-peak direction 136. Indeed, the EIRP at these angles, particularly for out-of-band emissions (such as when determining an Adjacent Channel Leakage Ratio (ACLR) 108 or a Spectral Emission Mask (SEM) 110 measurement) where power is much lower than a wanted signal, may be inaccurate due to insufficient signal-to-noise ratio (SNR) at the receiving device 132.

It should be noted that the 3GPP Technical Specification Group (TSG) Radio Access Network (RAN) Work Group 5 (WG5), or 3GPP RANS, has agreed to change the ACLR 108 verification for user equipment 10 from the TRP-based test metric 106 to the EIRP-based test metric 104, as reflected in FIG. 5. For ACLR 108, both the TRP-based test metric 106 and the EIRP-based test metric 104 provide the same or similar measurement as ACLR 108 is spatially flat, or independent of a spatial angle. The ACLR 108 may be measured at the beam-peak direction 136, as it may be least affected by the receiving device's 132 noise floor due to having a highest power spectral density (PSD) among all spatial angles when reaching the receiving device's 132 antenna 55.

Figures 7, 8:
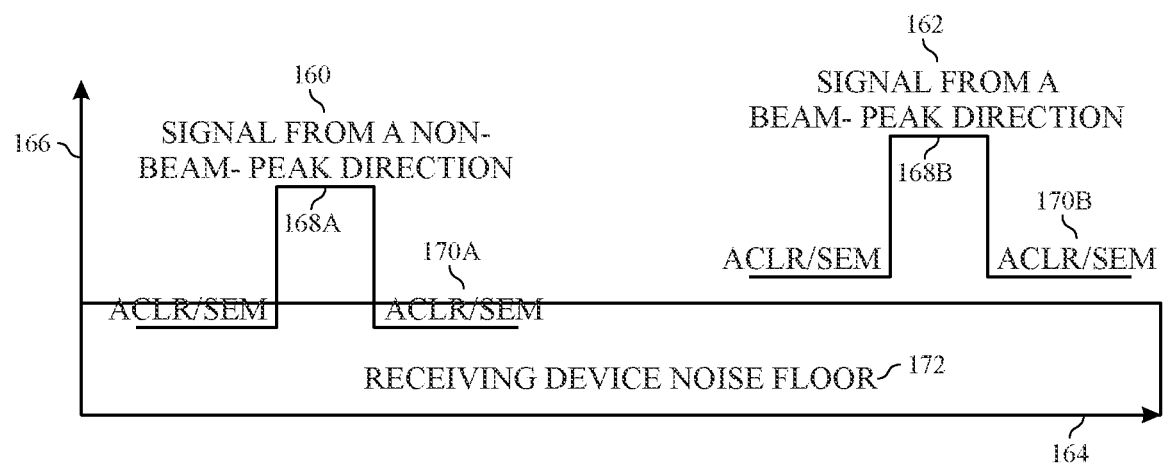
FIG. 7 is a table of spectrum emission limits and frequency characteristics of NR spectrum emission masks for a channel bandwidth in FR2 as specified by the 3GPP.
FIG. 8 is a frequency diagram showing a signal measured at a non-beam-peak direction (e.g., as may be the case when obtaining a Total Radiated Power (TRP)-based test metric) and a signal measured at the beam-peak direction (e.g., as may be the case when obtaining an Effective Isotropic Radiated Power (EIRP)-based test metric), according to embodiments of the present disclosure.

The TRP-based test metric 106 for the SEM 110 may be even more time-consuming and resource-intensive than that of the ACLR 108 due to the SEM measurement bandwidth being smaller and/or a frequency offset range being larger. FIG. 7 is a table of spectrum emission limits and frequency characteristics of NR spectrum emission masks for a channel bandwidth in FR2 as specified by the 3GPP. As illustrated, measurement bandwidth 150 is 1 megahertz (MHz) and a frequency offset range 152 (e.g., Moos) may be up to two times of the channel bandwidth (e.g., 50 MHz, 100 MHz, 200 MHz, 400 MHz) at either side of a target channel For example, for a 400 MHz channel bandwidth, using the TRP-based test metric 106 for the SEM 110, a TRP measurement might be performed for every 1 MHz step within the frequency offset range 152 of 800 MHz, yielding a total of 1600 EIRP measurements for each grid point of the sphere 138, where the number of grid points may range from above a hundred to more than a thousand for the sphere 138. This example would be extremely time-consuming and resource-intensive on both the user equipment 10 and the receiving device 132.

Because an emission nature within a range of the SEM is spatially flat (e.g., independent of a spatial angle), it may be feasible to perform the SEM measurement using the EIRP-based test metric 104. Not only may using the EIRP-based test metric 104 instead of the TRP-based test metric 106 for the SEM substantially reduce measurement/testing time (e.g., on the scale of reducing measurement/testing time by over 90%), but by measuring the SEM at the beam-peak direction 136, measurement accuracy may be improved, as it may provide superior SNR. FIG. 8 is a frequency diagram showing a signal 160 measured at a non-beam-peak direction (e.g., as may be the case when obtaining the TRP-based test metric 106) and the signal 162 measured at the beam-peak direction 136 (e.g., as may be the case when obtaining the EIRP-based test metric 104), according to embodiments of the present disclosure. The frequency diagram includes a horizontal or x-axis 164 representing frequency, and a vertical or y-axis 166 representing power. Using FIG. 6 as an example, the receiving device 132 may be disposed at a non-beam-peak direction 140, such as 30° from the beam-peak direction 136, when measuring the signal 160 at the non-beam-peak direction, whereas the receiving device 132 may be disposed at the beam-peak direction 136 (e.g., at 0°) when measuring the signal 162 at the beam-peak direction 136.

As shown in FIG. 8, power of the signal 162 at the beam-peak direction 136 is greater than power of the signal 160 at the non-beam-peak direction 140. In particular, each signal 160, 162, includes an in-channel power 168A, 168B (e.g., corresponding to a wanted signal sent in a channel), and an out-of-channel emission 170A, 170B (e.g., corresponding to ACLR and/or SEM). The in-channel power 168B of the signal 162 at the beam-peak direction 136 is greater than the in-channel power 168A of the signal 160 at the non-beam-peak direction 140, and the out-of-channel emission 170B of the signal 162 at the beam-peak direction 136 is greater than the out-of-channel emission 170A of the signal 160 at the non-beam-peak direction 140. Also shown is a noise floor 172 of the receiving device 132. The noise floor 172 may represent a power level at which noise of the receiving device 132 (e.g., a receiver 54 of the receiving device 132) becomes greater than or equal to the power of the signals 160, 162. Thus, when a power of a received signal 160, 162 is within the noise floor 172, accuracy of the measurement of the signal is poor, as it may be masked or overcome by the noise of the receiving device 132. As illustrated, when measuring the out-of-channel emission 170A (e.g., the ACLR and/or the SEM) of the signal 160 at the non-beam-peak direction 140 (e.g., using the TRP-based test metric 106), the out-of-channel emission 170A may fall within the noise floor 172 of the receiving device 132, and, as such, the measurement of the signal may be inaccurate. On the other hand, measuring the signal 162 at the beam-peak direction 136 (e.g., using the EIRP-based test metric 104) may more accurate, as the measurement of the signal 162, including the out-of-channel emission 170B, stays outside of and exceeds the noise floor 172.

The NR FR2 SEM limit as set forth by the 3GPP is defined as TRP with absolute power level (e.g., measured in decibels-milliwatts (dBm)), instead of relative power level (e.g., decibels (dB), per MHz. As such, the SEM measured at the beam-peak direction 136 may not be directly used to verify against the SEM limit. Advantageously, a power difference between the TRP SEM and the EIRP beam-peak SEM may be derived from a power difference between maximum TRP and maximum beam-peak EIRP of a wanted signal due to the spatially flat nature of SEM, as shown by Equation 2 below.

$$TRP_{SEM} = EIRP_{SEM\_Beam-peak} - (EIRP_{WantedSignal,Max} - TRP_{Max}) \quad \text{(Equation 2)}$$

Because the maximum TRP and the maximum beam-peak EIRP of the wanted signal are two transmitter requirements that are already performed by the receiving device 132 to conform to the 3GPP specification, these measurements may be obtained without additional test procedures.

The SEM measurement may then be determined by subtracting SEM power (e.g., EIRP at a SEM frequency range, such as within the out-of-channel emission 170B shown in FIG. 8) by a power difference ($\Delta P$) between the EIRP of the wanted signal at the beam-peak direction 136 and the maximum TRP of the wanted signal. In some embodiments, the receiving device 132 may determine EIRP of the SEM at each measurement bandwidth step (e.g., 1 MHz) at the beam-peak direction 136, which may be specified as shown in FIG. 7 by the 3GPP. The receiving device 132 may then determine TRP at each measurement bandwidth step by determining a difference between the EIRP of the SEM at that measurement bandwidth step at the beam-peak direction 136 and the power difference ($\Delta P$). If the derived TRP at each measurement bandwidth step meets the SEM specification (e.g., such as that shown in FIG. 7), then the receiving device 132 may report that the specification is met. If the derived TRP at any measurement bandwidth step does not meet the SEM specification, then the receiving device 132 may report that the specification has not been met.

Figure 9:
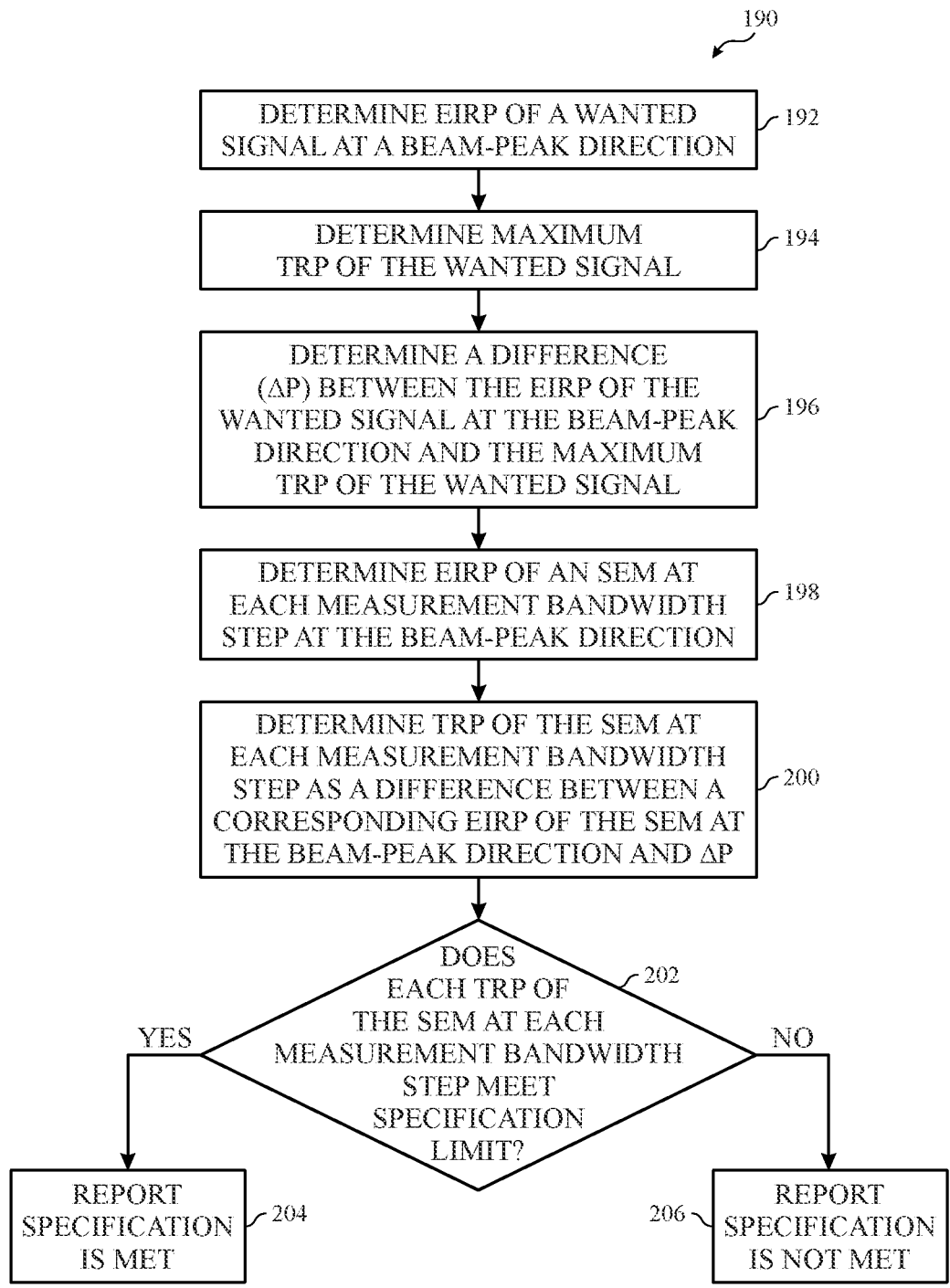
FIG. 9 is a flowchart of a method for verifying that the user equipment of FIG. 1 meets SEM specifications using an EIRP-based test metric, according to embodiments of the present disclosure.

FIG. 9 is a flowchart of a method 190 for verifying that the user equipment 10 meets SEM specifications using the EIRP-based test metric 104, according to embodiments of the present disclosure. Any suitable device (e.g., a controller) that may control components of the receiving device 132 and/or the user equipment 10, such as the processor 12, may perform the method 190. In some embodiments, the method 190 may be implemented by executing instructions stored in a tangible, non-transitory, computer-readable medium, such as the memory 14 or storage 16 of the receiving device 132 and/or the user equipment 10, using the processor 12. For example, the method 190 may be performed at least in part by one or more software components, such as an operating system of the receiving device 132 and/or the user equipment 10, one or more software applications of the receiving device 132 and/or the user equipment 10, and the like. While the method 190 is described using steps in a specific sequence, it should be understood that the present disclosure contemplates that the described steps may be performed in different sequences than the sequence illustrated, and certain described steps may be skipped or not performed altogether.

In process block 192, the processor 12 of the receiving device 132 determines or receives EIRP of a wanted signal at the beam-peak direction 136. In process block 194, the processor 12 of the receiving device 132 determines or receives a maximum TRP of the wanted signal. In process block 196, the processor 12 of the receiving device 132 determines a difference ($\Delta P$) between the EIRP of the wanted signal at the beam-peak direction 136 and the maximum TRP of the wanted signal. In process block 198, the processor 12 of the receiving device 132 determines EIRP of an SEM at each measurement bandwidth step (e.g., 1 MHz) at the beam-peak direction 136. The measurement bandwidth step may be specified by a standards body, such as shown in FIG. 7 by the 3GPP. In process block 200, the processor 12 of the receiving device 132 determines TRP of the SEM at each measurement bandwidth step as a difference between a corresponding EIRP of the SEM at the beam-peak direction 136 and $\Delta P$. In particular, the processor 12 may use the relationship shown in Equation 2 shown above to determine TRP of the SEM at each measurement bandwidth step.

In decision block 202, the processor 12 of the receiving device 132 determines whether each TRP of the SEM at each measurement bandwidth step meets a specification limit. That is, the processor 12 compares each TRP to a threshold power or emission limit. For example, the specification limit may vary by channel bandwidth and/or may be one or more of those shown in FIG. 7. If the processor 12 of the receiving device 132 determines that each TRP of the SEM at each measurement bandwidth step meets the specification limit, then, in process block 204, the processor 12 reports that the specification is met. If not, then, in process block 206, the processor 12 reports that the specification is not met. The receiving device 132 may use any suitable technique to report, provide a notification, or otherwise indicate that the specification has been met or has not been met, such as sending a notification (e.g., via a software application, an email client, or any other suitable communication), displaying a notification on the display 18 of the receiving device 132 and/or the user equipment 10, printing out a report, and so on.

In this manner, the method 190 verifies that the user equipment 10 meets SEM specifications using the EIRP-based test metric 104. By avoiding using a TRP-based test metric 106, the verification may be made with substantially reduced measurements in a substantially reduced testing time. Moreover, by avoiding measurements that fall into the noise floor 172 of the receiving device 132, accuracy may be greatly improved.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A method, comprising:
receiving, at processing circuitry, Effective Isotropic Radiated Power (EIRP) of a signal;
receiving, at the processing circuitry, a Total Radiated Power (TRP) of the signal;
receiving, at the processing circuitry, EIRP associated with a spectral emission mask (SEM);
determining, using the processing circuitry, TRP associated with the SEM based on the EIRP associated with the SEM, the EIRP of the signal, and the TRP of the signal; and
indicating, using the processing circuitry, whether the TRP associated with the SEM exceeds a threshold.

2. The method of claim 1, wherein receiving, at the processing circuitry, the EIRP of the signal comprises determining, using the processing circuitry, the EIRP of the signal at a beam-peak direction of the signal.

3. The method of claim 2, determining, using the processing circuitry, the EIRP of the signal at the beam-peak direction of the signal comprises determining, using the processing circuitry, a maximum EIRP of the signal at the beam-peak direction of the signal.

4. The method of claim 1, wherein the TRP of the signal comprises a maximum TRP of the signal.

5. The method of claim 1, wherein receiving, at the processing circuitry, the EIRP associated with the SEM comprises determining, using the processing circuitry, the EIRP associated with the SEM at a beam-peak direction of the signal.

6. The method of claim 1, wherein determining, using the processing circuitry, the TRP associated with the SEM comprises determining, using the processing circuitry, a difference between the EIRP of the signal and the TRP of the signal.

7. The method of claim 6, wherein determining, using the processing circuitry, the TRP associated with the SEM comprises determining, using the processing circuitry, a difference between the EIRP associated with the SEM and the difference between the EIRP of the signal and the TRP of the signal.

8. One or more tangible, non-transitory, computer-readable media, storing instructions that are configured to cause processing circuitry to:
- receive Effective Isotropic Radiated Power (EIRP) of a signal;
- receive a Total Radiated Power (TRP) of the signal;
- receive EIRP associated with a spectral emission mask (SEM);
- determine TRP associated with the SEM based on the EIRP associated with the SEM, the EIRP of the signal, and the TRP of the signal; and
- indicate whether the TRP associated with the SEM exceeds a threshold.

9. The one or more tangible, non-transitory, computer-readable media of claim 8, wherein the instructions are configured to cause the processing circuitry to receive a plurality of EIRPs associated with the SEM, the plurality of EIRPs separated by a measurement bandwidth step and comprising the EIRP associated with the SEM.

10. The one or more tangible, non-transitory, computer-readable media of claim 9, wherein the measurement bandwidth step comprises 1 megahertz.

11. The one or more tangible, non-transitory, computer-readable media of claim 9, the instructions are configured to cause the processing circuitry to determine a plurality of TRPs associated with the SEM based on the plurality of EIRPs associated with the SEM, the EIRP of the signal, and the TRP of the signal, the plurality of TRPs comprising the TRP associated with the SEM.

12. The one or more tangible, non-transitory, computer-readable media of claim 11, wherein the instructions are configured to cause the processing circuitry to determine the plurality of TRPs associated with the SEM by determining a difference between the EIRP of the signal and the TRP of the signal.

13. The one or more tangible, non-transitory, computer-readable media of claim 12, wherein the instructions are configured to cause the processing circuitry to determine the plurality of TRPs associated with the SEM by determining a plurality of differences between each EIRP of the plurality of EIRPs associated with the SEM and the difference between the EIRP of the signal and the TRP of the signal.

14. The one or more tangible, non-transitory, computer-readable media of claim 13, wherein the instructions are configured to cause the processing circuitry to indicate whether each TRP of the plurality of TRPs associated with the SEM exceeds a respective threshold of a plurality of threshold, the plurality of thresholds comprising the threshold.

15. A receiving device, comprising:
- one or more antennas;
- a receiver configured to receive a signal via the one or more antennas; and
- processing circuitry configured to
  - receive Effective Isotropic Radiated Power (EIRP) of the signal,
  - receive a Total Radiated Power (TRP) of the signal,
  - receive EIRP associated with a spectral emission mask (SEM),
  - determine TRP associated with the SEM based on the EIRP associated with the SEM, the EIRP of the signal, and the TRP of the signal, and
  - indicate whether the TRP associated with the SEM exceeds a threshold.

16. The receiving device of claim 15, wherein the EIRP associated with the SEM comprises the EIRP for out-of-channel emissions, and the TRP associated with the SEM comprises the TRP for the out-of-channel emissions.

17. The receiving device of claim 15, wherein the signal comprises a frequency between 24.25 gigahertz and 52.6 gigahertz.

18. The receiving device of claim 15, wherein the signal is sent from user equipment.

19. The receiving device of claim 15, wherein the TRP associated with the SEM is above a noise floor of the receiver.

20. The receiving device of claim 15, wherein the threshold is specified by the Third Generation Partnership Project.

* * * * *